US010790672B2

(12) United States Patent
Jury et al.

(10) Patent No.: US 10,790,672 B2
(45) Date of Patent: Sep. 29, 2020

(54) HYBRID SOLAR POWER SUPPLY CONTROL SYSTEM

(71) Applicant: DIGILOG TECHNOLOGIES PTY LTD, Happy Valley (AU)

(72) Inventors: Keith John Jury, Darlington (AU); Graham Charles Wilkins, Happy Valley (AU)

(73) Assignee: DIGILOG TECHNOLOGIES PTY LTD, Happy Valley (AU)

( * ) Notice: Subject to any disclaimer, the term of this patent is extended or adjusted under 35 U.S.C. 154(b) by 9 days.

(21) Appl. No.: 15/743,356

(22) PCT Filed: Jul. 14, 2016

(86) PCT No.: PCT/AU2016/050613
§ 371 (c)(1),
(2) Date: Jan. 10, 2018

(87) PCT Pub. No.: WO2017/008116
PCT Pub. Date: Jan. 19, 2017

(65) Prior Publication Data
US 2018/0205231 A1    Jul. 19, 2018

(30) Foreign Application Priority Data
Jul. 14, 2015 (AU) .................. 2015902783

(51) Int. Cl.
*H02J 3/38* (2006.01)
*H02J 1/10* (2006.01)
*H02J 7/34* (2006.01)

(52) U.S. Cl.
CPC ............. *H02J 3/385* (2013.01); *H02J 1/108* (2013.01); *H02J 3/382* (2013.01); *H02J 7/34* (2013.01)

(58) Field of Classification Search
USPC ........................................ 307/52
See application file for complete search history.

(56) References Cited

U.S. PATENT DOCUMENTS 5,493,155 A    2/1996 Okamoto et al.
7,145,265 B2 * 12/2006 McNulty ............... H02J 1/10
                                                           307/44

(Continued)

FOREIGN PATENT DOCUMENTS

EP          2317623          5/2011

OTHER PUBLICATIONS

Google Patents, Espacenet, AUSPAT, WPIAP & Epodoc with keywords and IPC/CPC Y02E10/50, Y02B10/70, H02J1/10, H02J3/38 solar, primary, secondary, power, supply, transfer, increase, load and similar terms.

(Continued)

*Primary Examiner* — Rexford N Barnie
*Assistant Examiner* — Xuan Ly
(74) *Attorney, Agent, or Firm* — Sand, Sebolt & Wernow Co., LPA

(57) ABSTRACT

Embodiments of the present invention provide a control system for a hybrid solar power supply system, in particular for direct current (DC) power supply. The hybrid solar power supply control system includes a power arbiter and a power controller. The power arbiter unit is connectable to a photovoltaic power supply and one or more other power supplies and comprises circuitry to connect the input photovoltaic power supply and other power supplies and combine power from one or more power supplies for direct current (DC) output, and transition between power supplies based on the available input power from each power supply. The power controller is configured to vary the apparent load applied at the DC output to control the power drawn from the one or more power supplies.

19 Claims, 7 Drawing Sheets

(56) References Cited

U.S. PATENT DOCUMENTS

| | | | |
|---|---|---|---|
| 7,825,615 B2 | 11/2010 | Chen et al. | |
| 2003/0182023 A1* | 9/2003 | Perez | G05F 1/67 |
| | | | 700/295 |
| 2013/0041516 A1* | 2/2013 | Rockenfeller | H02J 3/38 |
| | | | 700/287 |
| 2013/0249298 A1* | 9/2013 | Dong | H02J 3/005 |
| | | | 307/80 |
| 2014/0252862 A1* | 9/2014 | Cheng | H02J 3/385 |
| | | | 307/82 |
| 2014/0265595 A1 | 9/2014 | Chen et al. | |

OTHER PUBLICATIONS

Google Patents, Espacenet & AUSPAT Applicant (Digilog Technologies PTY LTED) and inventor (Jury, Keith John; Wilkins, Graham Charles) name search. Applicant and inventor name search on internal databases provided by IP Australia.

\* cited by examiner

HYBRID SOLAR POWER SUPPLY CONTROL SYSTEM

TECHNICAL FIELD

The technical field of the present invention is controllers for solar photovoltaic power supply systems for running specific equipment, an example of an application of the present invention is for solar powered systems for swimming pool filtering and heating systems, or other systems utilising pumps, DC motors, resistive and inductive heating loads.

BACKGROUND

Swimming pool systems require constant circulation and filtering of water to maintain a clean and healthy environment. Some swimming pool systems also have water heaters to extend the use of the pool through the changing seasons. To maintain a healthy pool the pumping system must be operated continuously through the year, even during months when the pool is not being used for swimming to prevent the water stagnating. The energy requirements for maintaining a pool can be significant, and can be particularly expensive if the pool system is powered using mains electricity.

Solar power, in particular photovoltaic (PV) solar power, is an attractive option for powering swimming pool systems. Solar power it is clean, renewable and economical. Further, swimming pools typically have a higher rate of use during the best time for harvesting solar energy—on sunny days during the warmer months of the year with longer daylight hours. Utilising a bank of solar PV panels and optionally solar water heating can significantly reduce both the monetary and environmental cost for energy to maintain a swimming pool system.

One drawback to solar PV for pool systems is that the power output from solar panels is not constant, and an alternative power supply is required for operation at night. Further, the solar PV array may not be able to produce sufficient power to drive the swimming pool system when it is raining or overcast, with low solar energy incident on the solar array. Further, the power output of a solar array can change rapidly, for example due to temporary shading of the solar PV array by clouds. Swimming pool systems may require more power to maintain operation than is output by a solar array in cloudy conditions. This can be a particular problem with swimming pool systems if pumps fail due to lack of power. In some systems, pumping failure can lead to other problems due to system components "running dry" or due to air in pipes. Further, restarting a pump in an incorrect state can lead to problems and reduced operational life of the pump and other pool system components. Thus, it is typically not feasible to allow the pumping system to stop and start in response to availability of solar power.

A solar power system for a pool will typically be a hybrid power system including solar and an alternative power supply, such as a battery backup, generator or mains power and a control system to cause the system to switch to an alternative power supply if the solar supply is inadequate. A known problem with switching between power supplies is maintaining continuity of adequate power to the swimming pool system to maintain operation of the pumps. There is a need for a control system to enable more efficient and reliable transition between power sources to maintain system operation. It is also desirable to maximise power output from the solar system.

SUMMARY OF THE INVENTION

According to one aspect of the present invention there is provided a hybrid solar power supply control system comprising:

a power arbiter unit connectable to a photovoltaic power supply and one or more other power supplies and comprising circuitry to connect the input photovoltaic power supply and other power supplies and combine power from one or more power supplies for direct current (DC) output, and transition between power supplies based on the available input power from each power supply; and a power controller configured to vary the apparent load applied at the DC output to control the power drawn from the one or more power supplies.

In some embodiments, the power arbiter unit hierarchically combines output power from one or more power supplies with proportions of output power being dependent on current highest power output of the one or more input power supplies.

In some embodiment, the photovoltaic power supply and other power supplies are configured such that the maximum peak power of the photovoltaic power supply is greater than the maximum power output of the other power supplies.

In an embodiment the power controller is configured to control the apparent load in accordance with a set program. For example, the set program can be based on anticipated power requirements.

An embodiment further comprises at least one sensor for each power supply and wherein the power controller is configured to control the apparent load based on at least one sensor output. In an embodiment, the apparent load can be controlled based on at least the power supply sensor of the solar photovoltaic power supply. In an embodiment, the apparent load is controlled to maintain operation of the solar photovoltaic power supply around the voltage at which maximum power is produced by the solar array (Vmp).

According to another aspect there is provided a hybrid solar power supply unit control system comprising:

a power arbiter unit connectable to a photovoltaic power supply and at least one variable voltage power supply and comprising circuitry to connect the input photovoltaic power supply and variable voltage power supply and combine power from the power supplies for direct current (DC) output, and transition between power supplies based on the available input power from each power supply; and a power controller configured to measure output current from each power supply and control the variable voltage power supply output voltage in accordance with a maximum power point tracking algorithm to cause the photovoltaic power supply to output maximum power for operating conditions.

The variable voltage power supply output voltage can be varied by varying an apparent load.

The maximum power can be determined as a condition where a maximum voltage is output from the photovoltaic power supply with output current from the photovoltaic power supply equal to the current output from the variable voltage power supply. The maximum power can be determined by iterative adjustment of the variable voltage power supply output voltage.

DETAILED DESCRIPTION

Embodiments of the present invention provide a control system for a hybrid solar power supply system, in particular for direct current (DC) power supply. The control system is configured to combine power input from a solar power supply and one or more other power supplies to maintain output power at a target level. Where the power supply from the solar photovoltaic power supply is sufficient for the target output power, then only solar power is used. Where the output from the solar power supply is insufficient, for example in cloudy conditions, combined power from the solar power supply and another power supply is used. For example, combined power supplied from the PV array and a battery and/or mains power.

Figure 1:
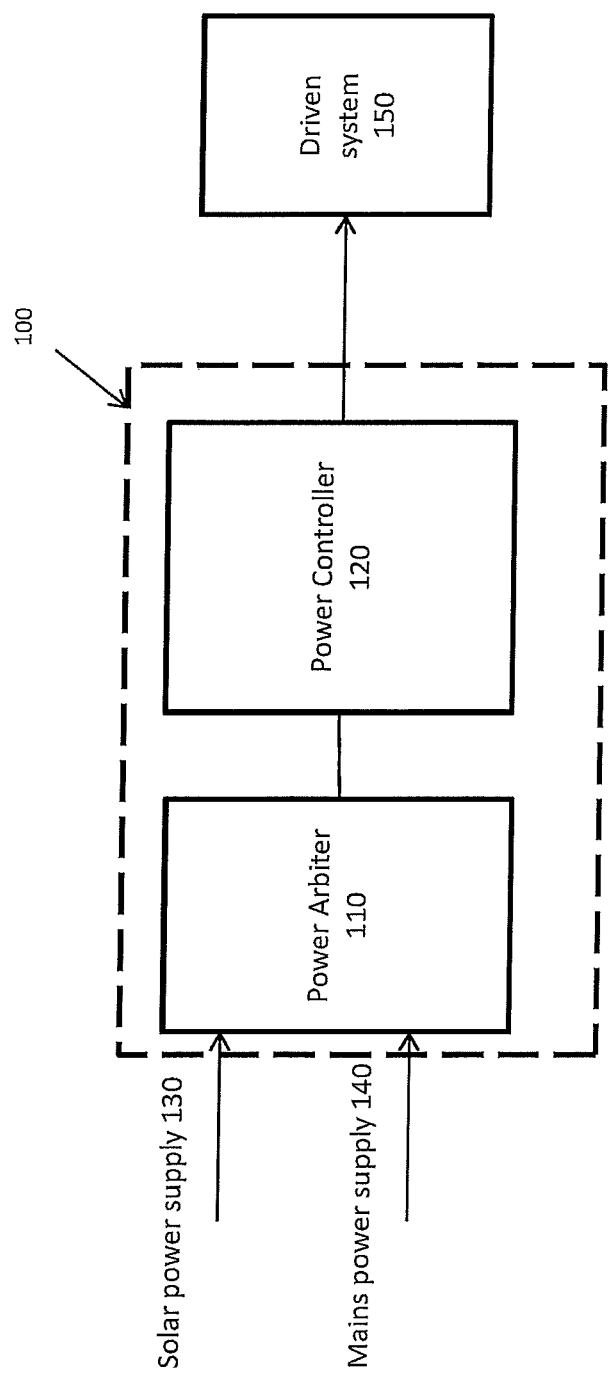
FIG. 1 shows an example of an embodiment of the hybrid power supply control system.

An example of an embodiment of the hybrid power supply control system is shown in FIG. 1, the control system 100 comprises a power arbiter 110 and a power controller 120. The power arbiter receives power input from a solar power supply, for example a solar PV array 130, and one or more other power supplies, for example mains power 140. Alternatively or additionally the other power supplies may include batteries, generators and other renewable energy power supplies such as wind or wave powered generators. The power arbiter 110 includes circuitry to enable combining of input power from one or more input power supplies. The Power controller is configured to direct variation of the apparent load applied at the output to draw the combined output power. The proportion of power from each input source in the combined output is based on the available input power and the apparent load. The apparent load determines the total power drawn at the output (R=V/I & P=VI) and the power arbiter determines the proportion of the output power supplied from each input power source by preferentially supplying power from the solar power supply and, if the solar power supply is insufficient for requirements, hierarchically selecting and optionally combining power supplied from one or more other power supplies.

Solar photovoltaic DC power generation utilises PV cells of a PV array that are excited by incident solar energy to produce electrical energy. The PV cells, and hence PV array, can operate over a wide range of voltages and currents. The maximum power point of a PV array is achieved when the array is operating in conditions where voltage and current are maximised. The maximum power point is dependent on incident illumination and the resistive load drawing current from the array. Typically the maximum power point for an array is determined by varying a resistive load from a very low (short circuit) value to a very high (open circuit) value to determine the load where the power output P=VI is maximised.

It should be appreciated that a solar array operates as a variable DC current supply and both the current and voltage will vary with the applied load and instant illumination. In practice, the instant illumination for a PV array is not a variable that is controlled as this is dependent upon nature—in some systems the orientation of the PV array can be varied, for example to follow the sun and maximise the incident illumination available, but ultimately operation is dependent on available sunlight which will vary, for example due to time or day, season and atmospheric conditions. To maximise power output from a PV array the operating load can be varied to maximise power output for the incident illumination. However, it should be appreciated that in some instances sufficient illumination may not be available to enable desired operating conditions to be achieved. Further the instant illumination can vary rapidly, and this variation may be too rapid for solar power generation to be feasible in some practical applications. For example, swimming pool systems, as discussed above, pumps or other applications where continuity of DC power supply is critical.

Embodiments of the present invention allow combining of solar power with power from additional sources, and transitioning between different power supplies to enable target operating conditions to be maintained. In such embodiments the power arbiter 110 enables the combining of power from different power supplies and transitions therebetween, and the control system 100 monitors and controls operating conditions, such as the variable load and/or controlling power supplies.

In a preferred embodiment the power arbiter is implemented in hardware. Each power supply is isolated at the input. DC power supplied from each input can be combined downstream of the input. The power supply utilised is based on the available power from each power supply, with the preferential power supply being that operating at the highest power, and where two power supplies are operating at the same power the proportions from each power supply will be equal. In preferred embodiments the power supplies are configured such that, during day time operating conditions, the power supplied from the solar PV array will typically exceed that of the other, secondary power supplies and thereby the solar power supply will be utilised preferentially during daytime operation. The output power is responsive to the load and the power arbiter circuitry is configured to allow uninterrupted transition between power supply for individual sources or combined power supply. The power arbiter circuitry is configured to ensure isolation between power supplies at the input for each power supply and combining of power drawn from each power supply downstream. The circuit enables current to be drawn from each power supply based on the load voltage, thereby the power supply having the highest voltage operate as the primary power supply. The power supplies can be configured such that typically the solar PV power supply will operate as the priory power supply during daylight hours.

In some embodiments of the system the input power supplies are preferably configured such that the power supply voltage of each secondary power supply is configured to have a maximum output voltage less than the solar power supply maximum power output voltage (Vmp).

The power controller is configured to vary the load to draw more or less power, this, in turn, can cause the proportion of output power from each input power supply to vary. For example, in sunny conditions the solar PV array may provide sufficient DC power supply for full operation a swimming pool system—for example, operating the filter system components and pumping and heater components and pumping at maximum capacity—but only 50-70% of power required in cloudy conditions. The power controller may be configured to allow the components of the swimming pool system to be switched off (for example, the heating system) or operate at a reduced power level (for example reducing the flow rate of the filtering system or heater system) to reduce the load in response to changing conditions. Alternatively the controller may be configured to change the load at programmed times, for example to reduce the power requirements at night when solar energy is not available. The load adjustment may be automatically controlled by the power controller or manually controlled, for example using a switch. In some embodiments both automatic and manual operation may be provided.

Figure 2:
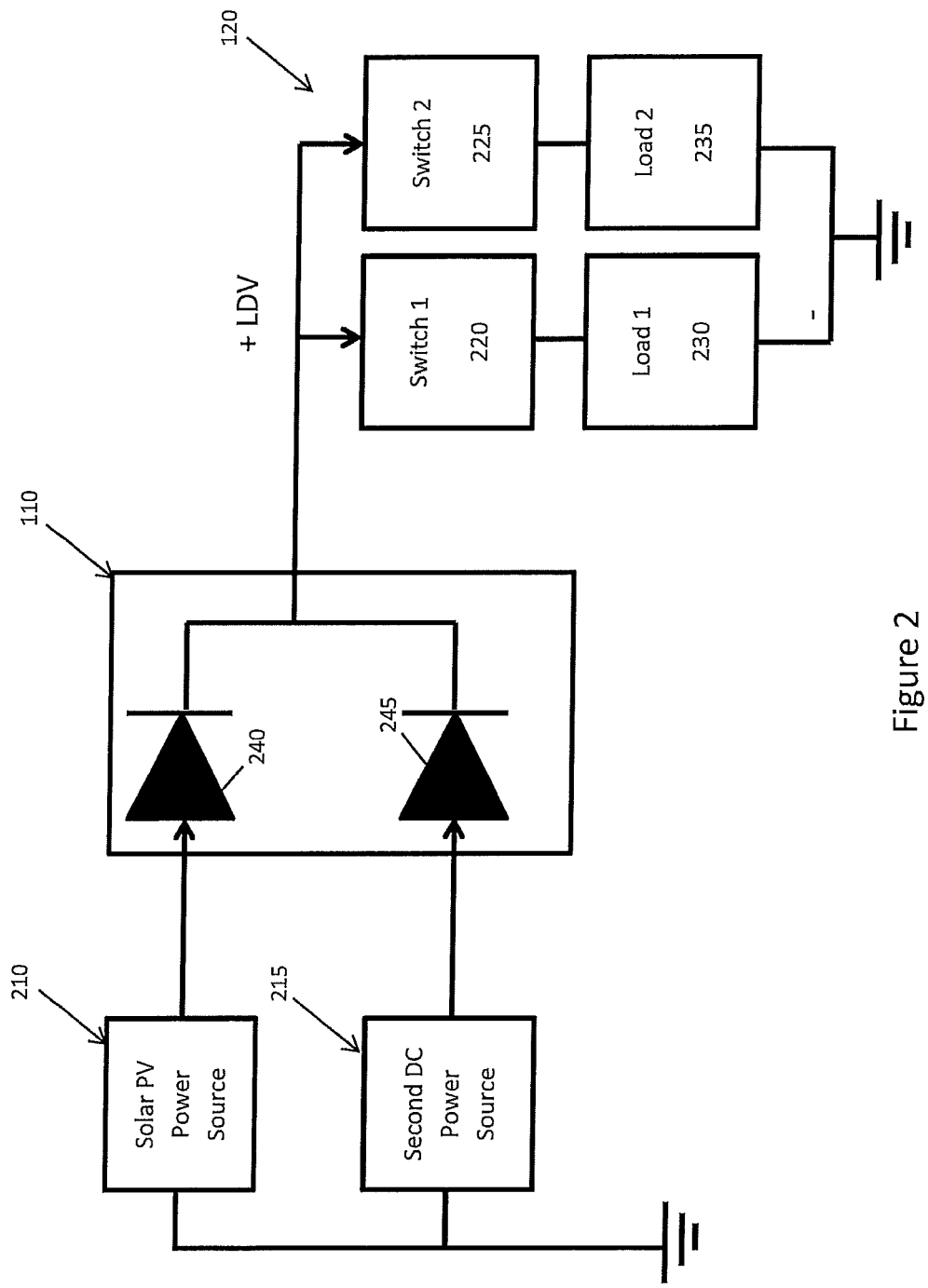
FIG. 2 shows a simplified representative example of a power arbiter in accordance with an embodiment of the invention.

A simplified example is shown in FIG. 2 for aiding explanation of the functions of the power arbiter 110 and power controller 120. In this example, the primary power supply 210 is solar photovoltaic power supply. The useful power range of the solar power supply 210 is from Voc (Solar array open circuit voltage) to Vmp (voltage at which maximum power is supplied by the solar PV array). The secondary power supply 215 is a DC power supply with voltage set below Vmp of the solar array. Vmp can vary between solar arrays and is also variable over time an in response to environmental conditions such as temperature, therefore an anticipated operating range for Vmp may be known (for example from a manufacturers specification or data sheet) or determined for the PV array. This Vmp range is used when determining the system configuration. The system may be configured with the operating voltage of the secondary power supply chosen to be below the lower end of the anticipated Vmp range for the PV array.

The power arbiter 110 (also referred to as a power arbiter/combiner) is represented in FIG. 2 as a simplified circuit comprising two diodes 240, 245, each representing the electrically isolated input for their respective power supply 210, 215, into the combiner circuit to allow combining of the input from each power supply into a single output. The power arbiter combiner dynamically responds to the load to draw power via the output from the two power supplies. In FIG. 2 the power controller is simplified to two switches 220, 225 to each switch in different load 230, 235. The switches are representative of a manual power controller, and load 1 and load 2 are representative of two speeds of a DC motor or pump. With switch 1 and switch 2 both open the "load dependent voltage" LDV is at Voc (open circuit voltage for the PV array). In this example, with switch 1 220 closed, load 1 230 presents a load on the PV array 210 to draw current from the PV array 210. This will cause LDV to drop down within the useful power range of the PV array 210. In this example the loads are configured such that with switch 1 only closed LDV is higher than the voltage supplied by the secondary power source 215, so all power to the load is from the PV array 210.

With switch 1 220 and switch 2 225 both closed, the load presented to the PV array 210 causes the LDV to fall below Vmp to a level which would match or be below the secondary power source 215. For example, drawing maximum current from the PV array, thus causing sub-optimal operating conditions and the voltage supply from the PV array 210 falling below Vmp. Under this condition the secondary power source 215 would supply all the power to the loads 230, 235. This occurs due to the voltage output for the secondary power source being higher than that of the PV array.

The power arbiter/combiner is configured to dynamically transition between the available power supplies based on the instantaneous available voltage of each power supply 210, 215 while current is being drawn by a load. Thus, if the voltage available from the PV array 210 drops temporarily (say due to cloudy conditions) to lower that the secondary power supply voltage 215, the secondary power supply 215 will become the primary power supply until the output voltage of the PV array increases again to above the secondary power supply voltage. During the transition between solar PV power and the secondary power supply, current will be drawn by the load from both power supplies, for example when the voltage output from each power supply is equal and neither is dominant. This enables a seamless transition between the fluctuating DC solar power supply and constant DC of the secondary power supply.

Figure 4:
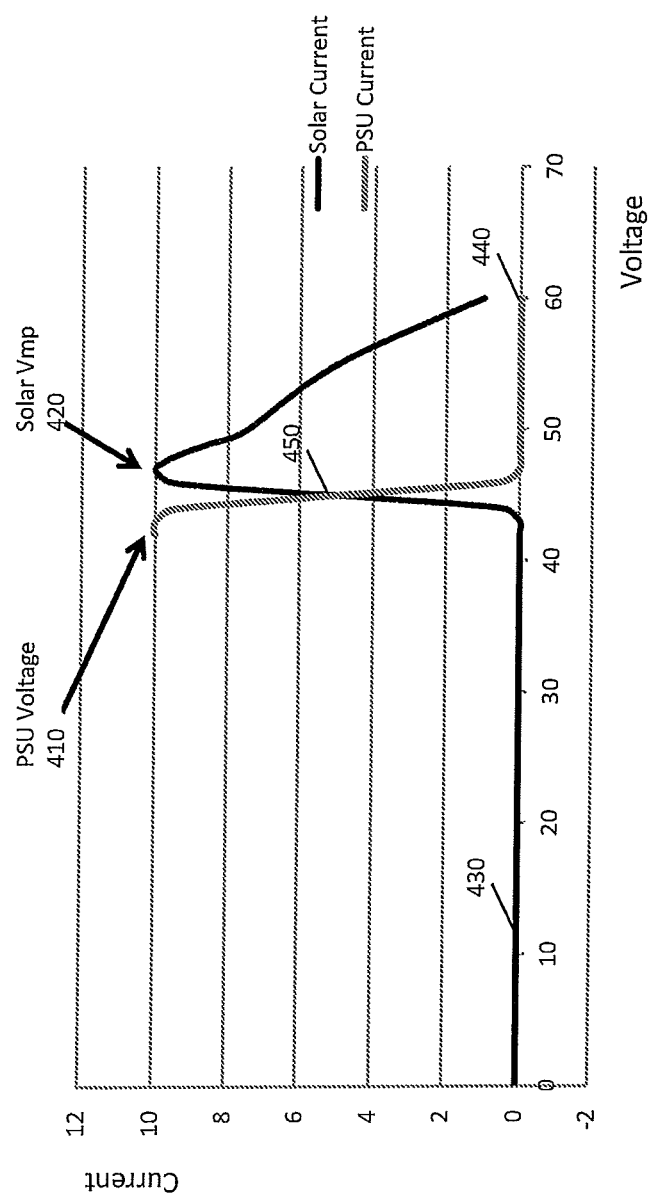
FIG. 4 shows a graph of typical setup conditions for transition.

The transition between the solar power supply and another power supply unit is described in more detail with reference to FIG. 4, which shows a graph of typical setup conditions for transition with ability for a power source to be chosen by adjusting the load applied to the output of the power arbiter. FIG. 4 shows the current drawn from the PSU 440 and solar power supply 430 with variation on voltage measured before the power arbiter. Typically the PSU voltage 410 is set to be below Solar Vmp 420 by two times the voltage drop from input to output of the power arbiter. For example Vmp 420 is around 50V in the example shown in FIG. 4 and PSU voltage is around 42V.

As the load is increased by the power controller to meet the DC motor required conditions, the solar voltage will fall from the initial no load Voc condition (not shown in FIG. 4) and current starts to be drawn from the solar power supply. The peak current is drawn at Vmp 420 and, in the example of FIG. 4, at this point all power is supplied by the solar power supply due to Vmp being higher than the PSU voltage. In the example of FIG. 4, as the voltage begins to fall marginally below Vmp, approaching the PSU voltage the power arbiter circuit causes some current to begin to be drawn from the PSU, which increases with drop in voltage to the PSU voltage 410 where all current is supplied by the PSU. As shown in FIG. 4, there is a transition phase, between Vmp and the PSU voltage, where current is drawn from both the PSU and solar array. This enables a transition between power supplies without interruption of power supply to the load, for example ensuring that operation of a pump (the load) is not interrupted. For example, this may represent circumstances where shadowing or nightfall causes a decrease in output voltage from the solar array and power supply transitions to the PSU to continue power supply to the load.

An embodiment of the system is configured to provide sufficient power from the solar system to match power supply requirements of the DC motor. Under this condition the power controller will apply a MPPT (maximum power point tracking) algorithm. If conditions arise where insufficient power is available to supply the load, the solar output voltage will fall below the PSU voltage causing the PSU to be the major power source. At this point the PSU current is monitored to limit the current to the PSU specifications. When the solar power is restored the major power source reverts to solar system and the MPPT algorithm is applied.

Maximum power from the system can be achieved by adjusting the PSU Voltage 410 to exactly Solar Vmp 420. In practice this would typically only be used where limited Solar panel space is available as it would limit the energy savings. Alternatively this could be used where continual hybrid operation is envisaged utilising maximum power form the solar array.

If the PSU voltage is set lower than shown, lower than Vmp and increasing the range between Vmp and PSU voltage, this would allow the system to operate on solar power over a wider range at the expense of a wider range of output power variation.

There are two levels of control system possible with this technology and both control types are applicable in the present invention:—
1. Fixed PSU voltage set with reference to PV panel manufacturers Vmp specifications, and can also vary based on solar panel wiring configuration and solar panel cell quantity, which varies the solar panels individual voltage.
2. Variable PSU voltage controlled by feedback from the power controller.

In the system using type 1 control, inherently the power variation is wider as the PSU voltage must be set lower to allow for Vmp variation with temperature. In some instances this can be as high as 10V. A type 1 system is more susceptible to rapid "cloud over" conditions and therefore should not be used for mission critical purposes or systems that are intolerant to power fluctuations, for example, refrigeration systems.

With type 2 control the PSU voltage is constantly adjusted to maintain consistent power output. The Vmp at any given time can be measured by adjusting the PSU voltage until the Solar and PSU currents are equal. Vmp will then be PSU voltage. The type 2 system can provide reliable power supply despite varying solar conditions.

Figure 5A:
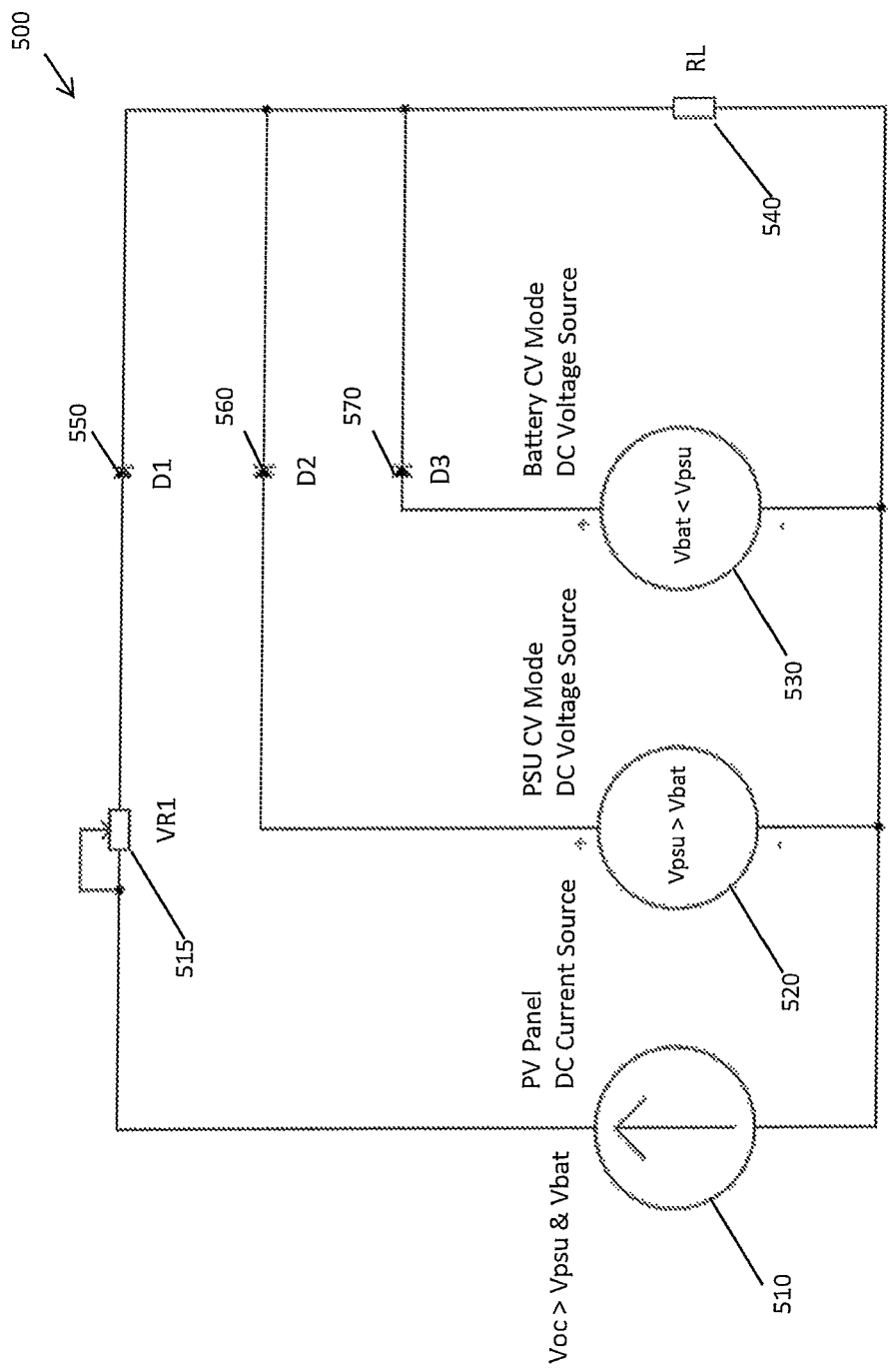
FIGS. 5a and 5b are representative highly simplified circuit block diagrams of an embodiment of a hybrid solar power system used to illustrate different operating conditions.
Figure 5B:
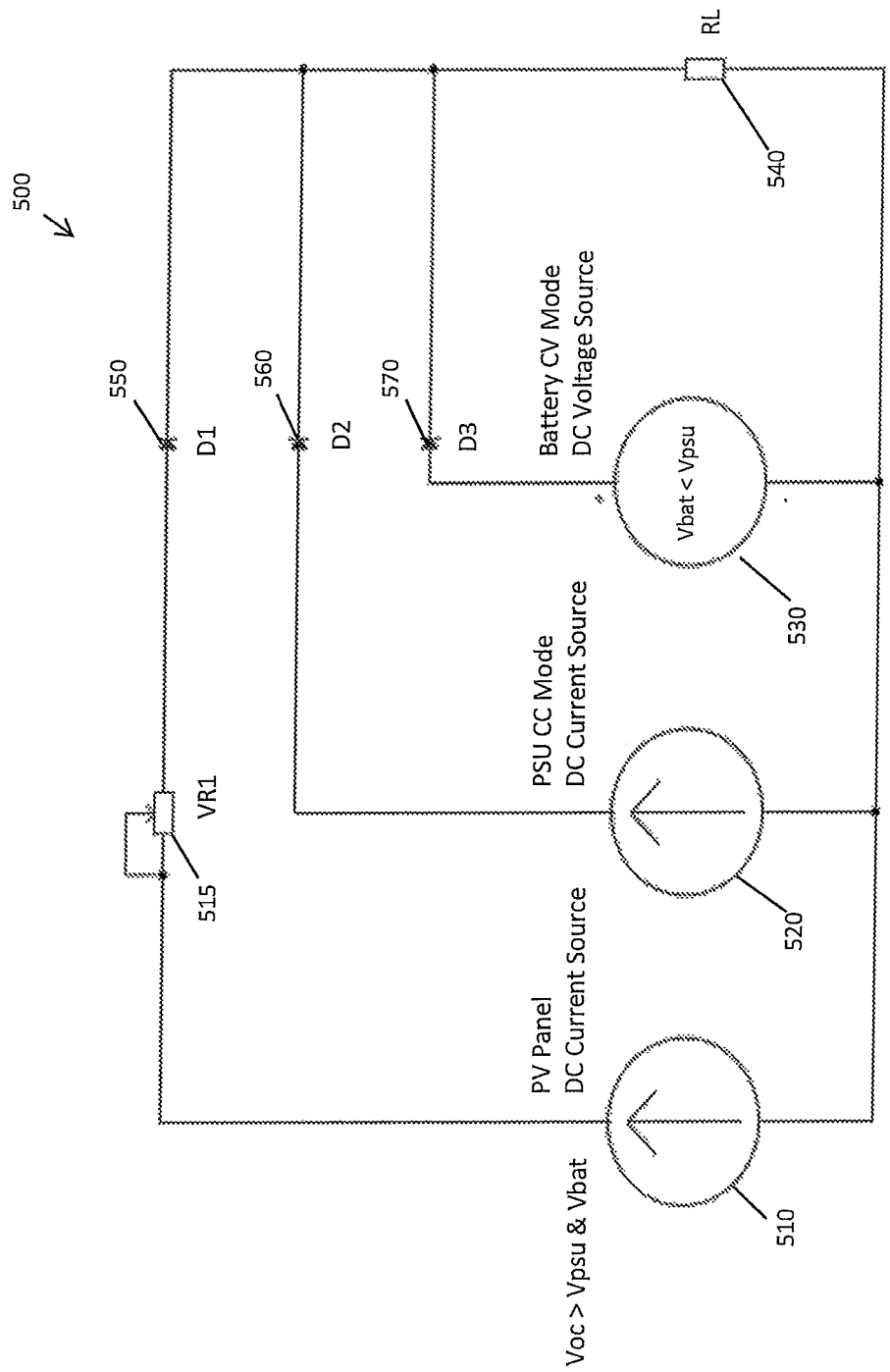

Conditions for power source change will now be discussed in more detail with reference to figures 5a and 5b, which are representative highly simplified circuit block diagrams of an embodiment of a hybrid solar power system in accordance with the invention. In FIGS. 5a and 5b, the hybrid solar power system 500 comprises a PV panel DC Current Source 510 and variable resistor VRI 515. VRI 515 value is controlled by solar input and temperature with negative coefficient. The system also comprises a DC voltage source 520 and a battery DC voltage source 530. RL 540 represents the system load. DI 550, D2 560 and D3 570 are representative of the isolation system between supply sources 510, 520, 530.

Condition 1 (illustrated in FIG. 5a).
 RL 540 high resistance.
 High solar input hence VRI 515 low resistance.
 Input voltage to DI 550 anode will be Voc.
 Input voltage to D2 560 anode will be Vpsu.
 Input voltage to D3 570 anode will be Vbatt.
 Voltage at cathodes of DI 550, D2 560 & D3 570 will Voc-diode drop.
 DI 550 will conduct and supply power to RL 540
 D2 560 will not conduct.
 D3 570 will not conduct.
Condition 2. (Illustrated in FIG. 5b)
 RL 540 resistance such that voltage drop across VRI 515 cause input voltage to DI 550 anode to be equal to Vpsu.
 Input voltage to DI 550 anode will be Vpsu.
 Input voltage to D2 560 anode will be Vpsu.
 Input voltage to D3 570 anode will be Vbatt.
 Voltage at cathodes of DI, D2 & D3 will Vpsu-diode drop.
 DI 550 will conduct and supply half total power to RL.
 D2 560 will conduct and supply half total power to RL.
 D3 570 will not conduct.
Under this condition the voltage of the PV power supply 510 is matched by the DC power supply 520, so in this balance condition power is supplied equally by each of the PV 510 and DC 520 power supplies.

Condition 3.
 RL resistance such that voltage drop across VRI cause input voltage to DI anode to be less than Vpsu.
 Input voltage to DI anode will be Vpsu.
 Input voltage to D2 anode will be Vpsu.
 Input voltage to D3 anode will be Vbatt.
 Voltage at cathodes of DI, D2 & D3 will Vpsu-diode drop.
 DI will not conduct.
 D2 will conduct and supply total power to RL.
 D3 will not conduct.
Condition 4.
 RL resistance such that voltage drop across VRI cause input voltage to DI anode to be less than Vpsu but greater than Vbatt. In this condition the psu will be in constant current mode and voltage output will be variable with load.
 This voltage designated as VpsuCC
 Input voltage to DI anode will be VpsuCC.
 Input voltage to D2 anode will be VpsuCC.
 Input voltage to D3 anode will be Vbatt.
 Voltage at cathodes of DI, D2 & D3 will Vpsu-diode drop.
 D1 will not conduct.
 D2 will conduct and supply total power to RL limited by the current limit set on the psu.
 D3 will not conduct.
Condition 5.
 resistance such that voltage drop across VRI cause input voltage to D1 anode to be Vbatt. In this condition the psu will be in constant current mode and voltage output will be variable with load. This voltage designated as VpsuCC will now be equal to Vbatt.
 Input voltage to D1 anode will be Vbatt.
 Input voltage to D2 anode will be Vbatt.
 Input voltage to D3 anode will be Vbatt.
 Voltage at cathodes of D1, D2 & D3 will Vpsu-diode drop.
 D1 will not conduct.
 D2 will conduct and supply power to RL limited by the current limit set on the psu.
 D3 will not conduct will supply balance of power to RL.
It should be noted that as the PV panel is a current source it's voltage output will float up to the voltage across RL causing a minimal leakage current to flow when the other inputs are supplying the majority of the power.

In an embodiment the power controller varies the load presented to the power sources in accordance with the system Mode setting. For example, with constant power level mode, the speed of the motor can be set and held constant, regardless of changing solar conditions by transparently switching power sources. Operating in a source priority mode, the speed of the motor would be set to the maximum required for the purpose but the actual speed achieved would be adjusted to keep the load voltage at Vmp wherever possible and to only switch to a secondary power source under "cloud over" conditions. In both case the power controller would set the maximum available power to the secondary power source spec when LVD=secondary power source voltage. The motor speed is determined by:
1. User settings;
2. Sensor inputs, temperatures, pressures or flow meters.
The active power controller can take the form of a microcontroller with analogue peripherals or in its simplest form, an analogue computation system.

Figure 3:
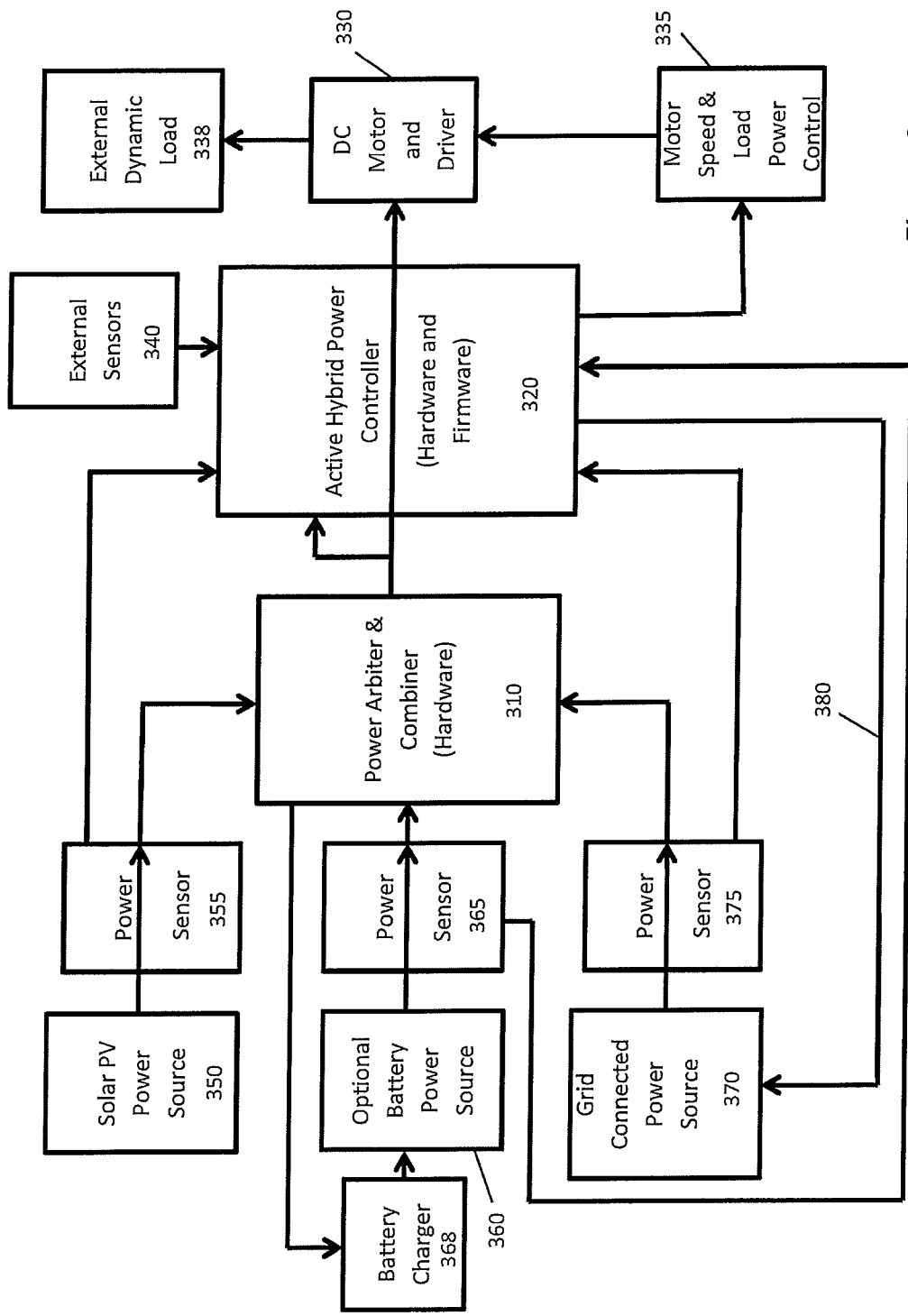
FIG. 3 is block diagram of a preferred embodiment of the system

FIG. 3 shows a block diagram of a preferred embodiment of the system, in this embodiment the power arbiter and combiner 310 is implemented in hardware, for example a circuit board having input ports for connecting each power supply, an output port and circuitry for combining the inputs from each power supply. The inputs are connected to a solar PV power source 350, an optional battery power source 360 and grid connected power source 370. A power sensor is also associated with each power source in this embodiment. Embodiments of the invention are designed to always operate with PV power plus at least one other power source. The power arbiter/combiner 310 transparently switches between power sources 350, 360, 370.

The power arbiter and combiner output port is connected to a DC motor and driver. The output power from the power arbiter and combiner is also monitored by the active hybrid power controller 320. The active hybrid power controller 320 of this embodiment is implemented in hardware and firmware, for example a microprocessor or programmable logic controller mounted on a circuit board carrying supporting hardware, circuits for enabling connection to the power arbiter and combiner 310, external sensors 340, power supply sensors 355, 365, 375 and load control 335.

In a preferred embodiment the active hybrid power controller microprocessor is programmed to monitor operating conditions of the system and control the load (the DC more speed and load power) in accordance with defined operating modes. The algorithms executed by the microprocessor may vary between embodiments and be based on specific operating environment, system configurations and user preferences. The key functionality of the hybrid power controller is to control the motor speed and loading causing output power to be drawn from the power arbiter and combiner. The active hybrid power controller decides how much power will be supplied to the motor 330 using cost/power-consistency defined by the application. For example, if the power is only required in daylight hours, minimal power can be allowed from sources other than solar at the expense of power level consistency. If power is required twenty four hours a day the power level is maintained regardless of power source, typically incurring extra financial expense due to more frequent transition to mains power.

Each power source 350, 360, 370 has a sensor 355, 365, 375 on the output to measure voltage and current. The outputs of the sensors are constantly measured by the Active Hybrid Power Controller 320 and utilised to determine wither or not variation in loading is required to maintain target operating conditions in accordance with a programmed operating regime. Controlling output power via load variation enables a demand responsive regime where the required power for the drive system is drawn from whichever source or sources have supply available to meet the demand.

The Power Combiner/Arbiter 310 receives power from all sources whilst maintaining isolation between the sources. The Power Combiner output supplies power to the Motor 330 and the Active Hybrid Power Controller 335. The Power Arbiter 310 uses the highest source voltage as the output to be used. The Battery power source 360 voltage and the Grid Connect power source voltage 370 will always be configured to be lower than the Solar PV VMP specification, thus causing the system to operate preferentially from the solar power supply 350 and in particular around the maximum power output voltage. The Battery power source could be higher or lower than the Grid Connect power source depending on the application.

The voltage from the PV source will depend on:—
1. Solar conditions
2. Load applied to the output.
The applied load is controlled by the Active Hybrid Power Controller which will operate under two possible modes:—
1. Constant power level.
In this operating mode, every power source available is used in order to maintain the power required for the application. The system will switch between power sources to maintain a target constant output power. In this operating mode a MPPT (Maximum Power Point Tracking) calculation will be applied to the Solar Input as the first power source but if insufficient solar power is available at any instant alternative sources will be used in voltage order.

2. Source priority mode.

In this operating mode the active hybrid controller will use a MPPT calculation to aim to maintain the output power at a level where the power is drawn by the load from the solar power supply at or around the maximum power point. The active hybrid controller monitors the solar PV power supply and applies a MPPT calculation to determine whether or not the PV array is operating at or near the maximum power point and adjust the apparent load (for example by varying the motor speed) to aim to maintain operation at maximum power (Vmp). The allowed load variation may be limited to ensure operation of the driven system is not compromised, for example by allowing operating parameters (i.e. motor speed, gearing, stage switching) to only be varied within defined ranges. Algorithms, ranges and limits, for load variation for a driven system can be defined based on system configuration and programmed into the active hybrid power controller microprocessor and memory. If short term solar power interruptions occur due to "cloud over" conditions the other sources will "fill in" the gaps in voltage level order. In this operating mode the load applied to solar source will be adjusted by the active hybrid controller aiming to maintain the solar system at Maximum Power Point until end of daylight hours. At end of daylight hours the application will determine if the system is shutdown or power is supplied from the other sources.

A combination of the two modes could also be used in some applications. For example, a swimming pool system may be able to be manually switched to a constant power level mode during a high use period and operate at other times in a source priority mode to maximise solar power use and minimise expense.

Some embodiments where battery power 360 is used as a secondary power supply may include a battery charger 368 and the power arbiter controller configured to supply a portion of available solar power 350 for recharging the battery. In some embodiments battery recharging may be selectively switched on and off based on the available solar power, for example, to switch off battery recharging in low light conditions.

Some embodiments may also be configured with feedback control from the active power controller to a secondary power source to enhance control of power supply selection and combining. For example, to control in input secondary power supply voltage to improve control of the solar PV input voltage aiming to maintain operation at Vpm and PV array maximum power.

Embodiments can also be configured to operate in a solar power maximisation mode. In this mode the controller adjust operation to maintain operation of the solar array at the maximum power point. In this embodiment the controller is configured to measure the current drawn from the solar power supply 350 and the current drawn from a mains connected power supply 370, for example using respective sensors 355 and 375. The controller, in accordance with programmed logic control instructions, adjusts the mains connected power supply 370 voltage via a control loop 380 until both the measured solar power supply current and the measured mains connected power supply currents are equal. For example, by the controller causing incremental adjustments of a variable voltage control circuit (i.e. controlling variable transformer or resistance) in the mains connected power supply 370 to alter the voltage output (voltage controlled mode) of a mains connected power supply unit. Alternatively load may be varied to alter the operating voltage.

After each adjustment the respective solar and mains power supply current are measured and incremental adjustments continue until both currents become equal, indicating the same power is being drawn from the solar array as for the mains power supply. When both currents become equal the power supply is incrementally step up until the mains power supply current become higher than the solar current. The power supply is then stepped back to the equal current top voltage level. The Vmp of the solar system is reached. To be able to do this measurement it is necessary for the power supply to have a voltage output range from below the minimum possible Vmp to above the maximum possible Vmp.

Figure 6:
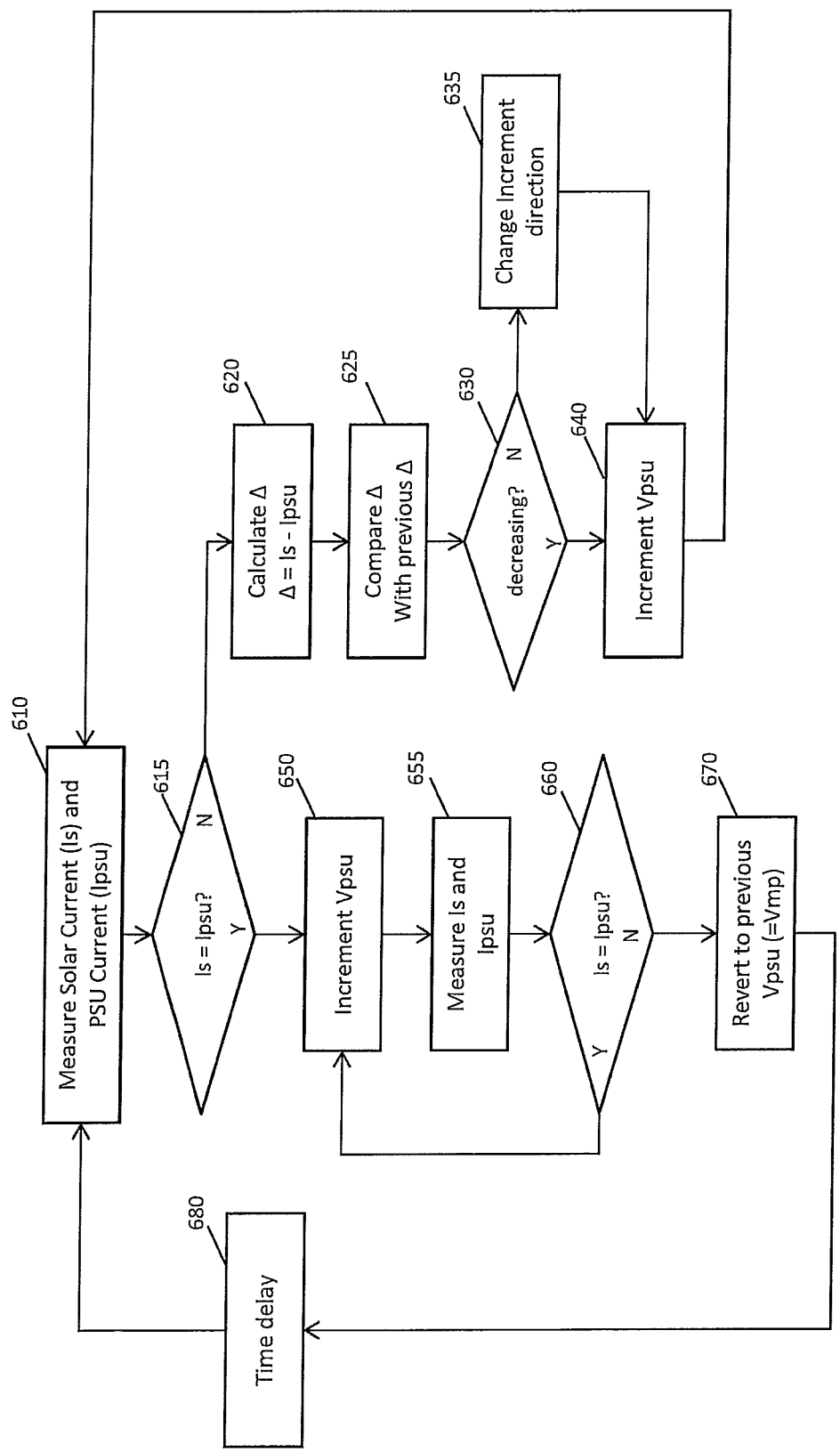
FIG. 6 is a flowchart of an example of a process for mppt testing under varying load.

An example of a process for mppt testing under varying load is shown in the flowchart of FIG. 6, in this example the controller starts 610 by measuring the current Is output by the solar array and the mins connected power supply current Ipsu. The two measured current values are compared 615 to see if these are equal. If the solar Is and mains power supply Ispu currents are not equal the controller determines an incremental adjustment, aiming to equalise the current from each power supply through iterative adjustments to the system operating conditions and the mains power supply voltage Vpsu. In the example shown the controller determines the difference between the two measured current Is and Ipsu 620 and compares this with the difference from the previous measurement 625 to determine whether the difference between the currents is increasing or decreasing 630. It should be appreciate the magnitude of the difference between Is and Ipsu can indicate whether these values are near equalisation and whether the magnitude of this difference is increasing or decreasing will also indicate whether iterative adjustments are causing the current values to move toward or away from equalisation. If the magnitude of the difference between Is and Ipsu decreasing, then the values are converging and it can be assumes that continuing incremental changes 640 If the magnitude of the change between Is and Ipsu is increasing 630, then the increments are causing Is and Ipsu to move away from equalisation, and therefore the direction of adjustment (i.e. increment or decrement Vpsu) can be reversed 635, the adjustment is then made 640 and measurements taken for the next iteration 610. It should be appreciated that the controller may be configured to adjust the magnitude of the adjustment to Vpsu as well as the direction based on the difference between Is and Ipsu, and rate of change between adjustment iterations. For example, the controller may reduce the magnitude of increments to Vpsu as the values of Is and Ipsu converge. Alternatively the magnitude of the adjustment may be fixed and only the direction be varied.

The controller is be configured to iteratively adjust the mains power supply voltage Vpsu until the current drawn from the solar array is equal to that drawn from the power supply 615. For example, looking at FIG. 4 this is representative of the crossover point 450 where the voltage and current values for each of the power supply and the solar array are equal. As is shown in the example of FIG. 4 the equalisation point 450 shown is below the solar array maximum power point Vmp, so although the same amount current is being drawn from each power supply this is not the maximum available from the solar array. Once this equalisation is achieved, the controller then adjusts the mains power supply voltage to search for the maximum power point of the solar array. The controller increments the power supply voltage Vpsu 650 and again measures 655 the solar array current Is and power supply current Ipsu. The measures currents are compared 660 to determine whether the increase in power supply voltage has caused a corresponding increase in solar array voltage and current Is output (for example, a right shift of the crossover point 450 towards Vmp in FIG. 4). If both current values Is and Ipsu are equal 660 then the controller further increments the power supply voltage 655 seeking the Vpm. If as a result of an increment 650 the measures Is and Ipsu currents 655 cease to be equal 660 then it can be assumed that the last increment has caused Vpsu to exceed the maximum power point voltage of the solar array, causing a decrease in current drawn from the solar array, the controller can be configured to then revert to the previous Vpsu where Is and Ipsu were equal, this being a maximum power point (Vmp) for the solar array for the current operating conditions. As solar conditions change, for example due to time or day and weather conditions, the controller is configured to repeat the maximum power point tracking routine. For example, a time delay of several seconds to several minutes may be set 680 then the process repeated again. Alternatively the controller may constantly monitor the maximum peak power point using this routine and adjust operating conditions to maintain maximum power solar array operation during daylight hours.

Daylight operation may be determined based on a timer or based on solar array output measurements. For example, the controller may have a lower light threshold voltage limit or a minimum Vpsu set in the controller. If the value at which Vmp is determined is below the low light threshold or adjustments searching for Vpm reach the minimum Vpsu before Vmp can be determined, then the mppt tracking operation mode is suspended and the mains power supply is allowed to become dominant. This suspension may be temporary during daylight hours and operating conditions (Is & Ipsu) continue to be monitored until equilibrium is again reached and mppt tracking operation can resume. For example, switching mode during cloud-over conditions and resuming mppt tracking operation once condition become sunny again. The minimum Vpsu can be set to ensure sufficient power is supplied to drive the load in cloud-over or dark conditions.

It should be appreciated that to enable this mode of operation, testing of the mppt under varying load and operating conditions aiming to maintain operation at the maximum solar array power point, it is necessary for the power supply to have a voltage output range from below the minimum possible Vmp to above the maximum possible Vmp. This embodiment is advantageous as it enables the system to maintain the maximum possible output of the solar array by the injection of the mains power supply.

It should be appreciated that, using this method of mppt tracking, it is possible to adjust the load accurately for either solar only operation at a maximum power level or a constant possible maximum hybrid power.

Embodiments of the invention are configured for power control from a solar PV source and always at least one additional power source with the purpose of optimising power usage when supplying a DC motor or other type of DC load. In particular the system of the present invention allows transition between input power sources without disruption to output power. Seamless power source transition in combination with load control/demand based power output enables high reliability and stability of power supply despite variability of supply from one power source. This is particularly advantageous for maintaining constant operation in a predominantly solar powered system.

The above examples have been discussed with reference to an example of a swimming pool system but embodiments may be applied for any system allowing DC load control, in particular applications using DC motors, pumps, resistive and inductive heating loads. The fields of use for the DC motor being considered could be pump or compressor drive, solar powered DC electrical water heating for hot water services, boilers or swimming pools, etc. Typical applications for embodiments of the invention are Swimming Pool Pumping and Refrigeration Compressor, both with DC motors. Any field where a DC motor is required for the application is applicable. It should be appreciated that embodiments of the hybrid power supply controller may be utilised with any type of domestic or industrial DC load system. For example, it is envisaged that embodiments of the hybrid power supply control system can be utilised to enable reliable hybrid solar power systems for operation of refrigerated heat pump and cooling systems. Currently solar power is underutilised in industrial processes due to variability of supply, and in particular lack of predictability for variations. Embodiments may also be applicable for other industrial processes. For example, industrial heating or air conditioning systems, water heating systems, etc. configured to operate on DC power supply. Embodiments enabling constant power supply under varying solar conditions can be particularly well suited to such industrial applications.

Embodiments can also be configured to maximise possible output of the solar system such that it will always be able to maintain the mppt with varying load and varying solar exposure.

Embodiments of the invention enable constant power supply under varying solar conditions. Embodiments of the power controller can also apply definable power source regimes to enable regulation of the amount of power drawn from multiple sources and under what conditions the multiple sources are used.

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A Direct Current (DC) hybrid solar power supply control system comprising:
   a power arbiter unit connectable to:
      a photovoltaic DC power supply wherein an output DC voltage of the photovoltaic DC power supply will vary with variance on incident solar radiation, the power arbiter unit being connected to the variable DC output of the photovoltaic DC power supply; and
      at least one other DC power supply operable at settable voltages;
   wherein the power arbiter unit includes circuitry to connect the photovoltaic DC power supply and the at least one other DC power supply and to combine power from the photovoltaic DC power supply and the at least one other DC power supply for DC output, and transition between the photovoltaic DC power supply and the at least one other DC power supply based on the available input power from the photovoltaic DC power supply and the at least one other DC power supply, such that a DC power output from the power arbiter unit will be from the one of the photovoltaic DC power supply and the at least one other DC power supply having a highest operating voltage;
   and wherein when the photovoltaic DC power supply and the at least one other DC power supply are operating at a same DC output voltage, the DC power output from the power arbiter unit will be combined from the photovoltaic DC power supply and the at least one other DC power supply for uninterrupted transition between the photovoltaic DC power supply and
   the at least one other DC power supply; and
   a power controller configured to direct variation of an apparent load applied at the DC output of the power arbiter unit to control C power drawn by the load to thereby influence the operating voltage of the photovoltaic DC power supply for incident solar radiation and transition between the photovoltaic DC power supply and the one or more at least one other DC power supply.

2. The DC hybrid solar power supply unit control system as claimed in claim 1, wherein the power arbiter unit hierarchically combines output DC power from one or more of the photovoltaic DC power supply and the at least one other DC power supplies supply with the highest proportions of output power being in relation to highest operating voltage of an individual one of the photovoltaic DC power supply and the at least one other DC power supply.

3. The DC hybrid solar power supply unit control system as claimed in claim 2, wherein the photovoltaic DC power supply and the at least one other DC power supply are configured such that a maximum peak power of the photovoltaic DC power supply is greater than a maximum DC power output of the at least one other DC power supply.

4. The DC hybrid solar power supply unit control system as claimed in claim 2, wherein the power controller is configured to control the apparent load in accordance with a set program.

5. The DC hybrid solar power supply unit control system as claimed in claim 4 wherein the set program is based on anticipated power requirements.

6. The DC hybrid solar power supply unit control system as claimed in claim 2 further comprising at least one sensor for each of the photovoltaic DC power supply and the at least one other DC power supply and wherein the power controller is configured to control the apparent load based on at least one sensor output.

7. The DC hybrid solar power supply unit control system as claimed in claim 6 wherein the apparent load is controlled based on at least the power supply sensor of the solar photovoltaic DC power supply.

8. The DC hybrid solar power supply unit control system as claimed in claim 7 wherein the apparent load applied at the DC output is controlled to maintain operation of the solar photovoltaic DC power supply around the voltage at which maximum power is produced by the combined solar cells (Vmp).

9. A Direct Current (DC) hybrid solar power supply unit control system comprising:

a power arbiter unit connectable to:
- a photovoltaic DC power supply, wherein an output DC voltage of the photovoltaic DC power supply will vary with variance on incident solar radiation, the power arbiter unit being connected to the variable DC output of the photovoltaic DC power supply; and
- at least one variable voltage other DC power supply, wherein an operating voltage of the at least one variable voltage DC power supply is variable under control of a controller to provide a controlled variable DC voltage power supply;

wherein the power arbiter unit includes circuitry to connect the input photovoltaic DC power supply and the controlled variable DC voltage power supply and combine power from the photovoltaic DC power supply and the controlled variable DC voltage power supply for a controlled DC output, and transition between the photovoltaic DC power supply and the controlled variable DC voltage power supply based on the available operating voltage from each of the photovoltaic DC power supply and the controlled variable DC voltage power supply, such that the DC power output from the power arbiter unit will be from the one of the photovoltaic DC power supply and the controlled variable DC voltage power supply having a highest operating voltage, and wherein when the photovoltaic DC power supply and the controlled variable DC voltage power supply are operating at the same DC output voltage, the DC power output from the power arbiter unit will be combined from the photovoltaic DC power supply and the controlled variable DC voltage power supply for uninterrupted transition between the photovoltaic DC power supply and the controlled variable DC voltage power supply; and a power controller configured to measure output current from each of the photovoltaic DC power supply and the controlled variable DC voltage power supply and control the controlled variable DC voltage power supply to adjust the output voltage in accordance with a maximum power point tracking algorithm, such that the output voltage from the controlled variable DC voltage power supply is equal to that of the output voltage of the photovoltaic DC power supply to thereby cause the photovoltaic DC power supply to output maximum power for operating conditions.

10. The DC hybrid solar power supply unit control system as claimed in claim 9 wherein the controlled variable DC voltage power supply output voltage is varied by varying an apparent load applied at the DC output.

11. The DC hybrid solar power supply unit control system as claimed in claim 9 wherein the maximum power is determined by iteratively increasing the voltage of the controlled variable DC power supply to identify a condition where a maximum DC voltage is output from the photovoltaic DC power supply.

12. The DC hybrid solar power supply unit control system as claimed in claim 11 wherein the determination of maximum power by iterative adjustments of the controlled variable DC voltage power supply output voltage is repeated periodically or continuously to adjust for varying solar conditions.

13. The DC hybrid solar power supply unit control system as claimed in claim 3, wherein the power controller is configured to control the apparent load in accordance with a set program.

14. The DC hybrid solar power supply unit control system as claimed in claim 13, wherein the set program is based on anticipated power requirements.

15. The DC hybrid solar power supply unit control system as claimed in claim 3, further comprising at least one sensor for each of the photovoltaic DC power supply and the controlled variable DC power supply and wherein the power controller is configured to control the apparent load applied at the DC output based on at least one sensor output.

16. The DC hybrid solar power supply unit control system as claimed in claim 15, wherein the apparent load is controlled based on at least the power supply sensor of the photovoltaic DC power supply.

17. The DC hybrid solar power supply unit control system as claimed in claim 16, wherein the apparent load is controlled to maintain output of the photovoltaic DC power supply to maintain the voltage at which maximum DC power is produced by the photovoltaic DC power supply (Vmp) in conjunction by interactive adjustment of the voltage from the controlled variable DC power supply in relation to the sensor of the photovoltaic DC power supply to maximize the output of the photovoltaic DC power supply.

18. The DC hybrid solar power supply unit control system as claimed in claim 10, wherein the maximum power is determined by iteratively increasing the voltage of the controlled variable DC power supply to identify a condition where maximum DC voltage is output from the photovoltaic DC power supply whilst at the maximum potential output for the given available light.

19. The DC hybrid solar power supply unit control system as claimed in claim 18, wherein the maximum power is determined by iterative adjustment of the controlled variable DC voltage power supply output voltage.

* * * * *